United States Patent
Simpkins

(10) Patent No.: US 8,608,608 B1
(45) Date of Patent: Dec. 17, 2013

(54) APPARATUS FOR MULTIPLYING TORQUE

(71) Applicant: Oral Evans Simpkins, Grantville, GA (US)

(72) Inventor: Oral Evans Simpkins, Grantville, GA (US)

(73) Assignee: Oral Evans Simpkins, Grantville, GA (US)

( * ) Notice: Subject to any disclaimer, the term of this patent is extended or adjusted under 35 U.S.C. 154(b) by 0 days.

(21) Appl. No.: 13/694,716

(22) Filed: Dec. 27, 2012

(51) Int. Cl.
*F16H 48/30* (2012.01)
*F16H 48/06* (2006.01)

(52) U.S. Cl.
USPC .......................................... 475/150; 475/230

(58) Field of Classification Search
USPC .......................................... 475/230, 4, 9, 150
See application file for complete search history.

(56) References Cited

U.S. PATENT DOCUMENTS

| | | | | |
|---|---|---|---|---|
| 1,476,329 A | * | 12/1923 | Duesenberg | 475/247 |
| 4,573,370 A | * | 3/1986 | Clemens | 74/337.5 |
| 6,140,741 A | * | 10/2000 | Tamai et al. | 310/323.13 |
| 6,893,371 B2 | * | 5/2005 | Mills et al. | 475/149 |
| 7,698,968 B2 | * | 4/2010 | Kobayashi | 74/640 |
| 7,798,032 B2 | * | 9/2010 | Schepperle et al. | 74/335 |
| 2002/0170513 A1 | * | 11/2002 | Willmot | 123/90.15 |
| 2006/0270511 A1 | * | 11/2006 | Hsieh et al. | 475/230 |
| 2008/0276734 A1 | * | 11/2008 | Fulton | 74/8 |
| 2009/0249908 A1 | * | 10/2009 | Kovacic et al. | 74/396 |
| 2011/0143879 A1 | * | 6/2011 | Vogel et al. | 475/230 |
| 2012/0075731 A1 | * | 3/2012 | Iikawa et al. | 359/824 |

* cited by examiner

*Primary Examiner* — Troy Chambers
*Assistant Examiner* — Gregory Prather

(57) ABSTRACT

An apparatus consisting of a motor with a cylindrical housing homocentric to the drive shaft of the motor. A pinion is affixed concentrically to the front end of the motor housing. The motor housing is fitted with bearings which allows the motor housing to rotate inside its support housing when torque is applied. Idler gears set in a frame perpendicular to the drive shaft mesh with the pinion attached to the motor housing, and link that pinion to a similar pinion affixed to the drive shaft of the motor. When the drive shaft is coupled to a workpiece and torque is applied the opposing force generated by the torque causes the motor housing and its pinion to rotate in the opposite direction. The idler gears linking the similar pinions redirects that opposing force toward the torque initiated by the motor thus compounding the amount of energy being applied to the workpiece.

8 Claims, 3 Drawing Sheets

APPARATUS FOR MULTIPLYING TORQUE

TECHNICAL FIELD

This disclosure relates to an apparatus for multiplying torque.

BACKGROUND

The invention herein described addresses torque multiplication. Other torque producing motors, whether they be electrical, as exemplified in the invention, or hydraulic or pneumatic, fail to utilize the equal amount of opposing torque generated by the originating torque.

BRIEF DESCRIPTION

Figure 1:
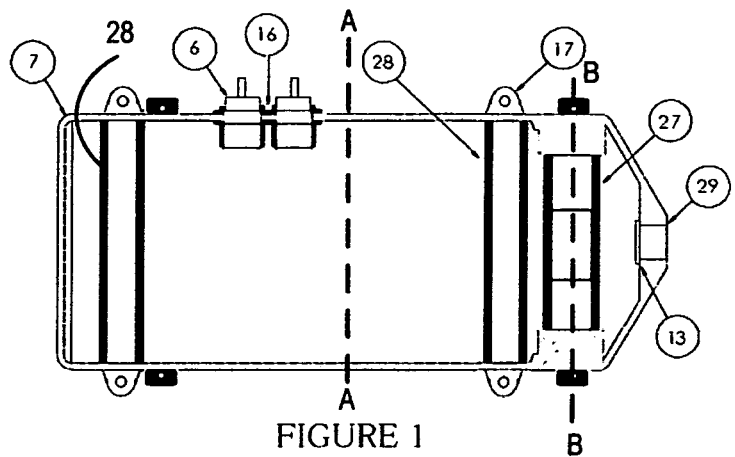
FIG. 1 illustrates a side cutaway view of the platform housing the invention
Figure 2:
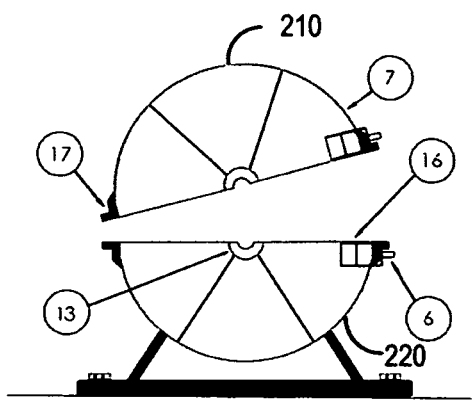
FIG. 2 illustrates an exploded frontal view of the platform housing the invention

The apparatus herein described harnesses the opposing force generated by torque being applied to a workpiece, and aims it in the same direction as the originating torque. This technique doubles the amount of torque being delivered to a coupled workpiece when the relatively small amount yielded to friction is set aside. This innovation can be applied to the powerful motors which turn the wheels of industry or a small motor driving the compressor of a household refrigerator. This innovation can enhance the endurance of batteries providing power to a handheld drill motor, or add travel distance to battery powered cars. Other torque producing products cannot make these claims.

DETAILED DESCRIPTION

FIGS. 1-6 defines a platform 7, of two mating semicircular, parts 210, 220 (see FIG. 2) which forms a cylindrical chamber by aligning their matching tabs 15 (see FIG. 5), and bonding them with fasteners 20. The back end of the cylindrical chamber is essentially closed and the front end of the cylindrical chamber has a circular opening 29 through which the drive shaft 12 of the motor 1 extends.

Figure 3:
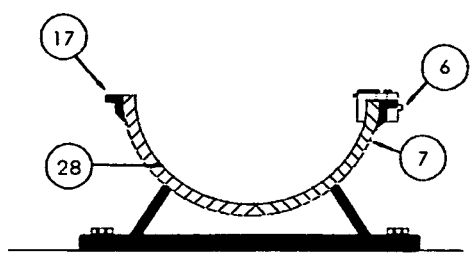
FIG. 3 illustrates a front view cutaway at lines A-A of FIG. 1 of the bottom half of the platform housing the invention.
Figure 4:
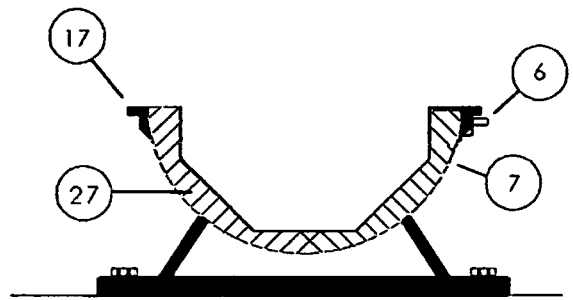
FIG. 4 illustrates a front view cutaway at lines B-B of FIG. 1 of the bottom half of the platform housing the invention.
Figure 5:
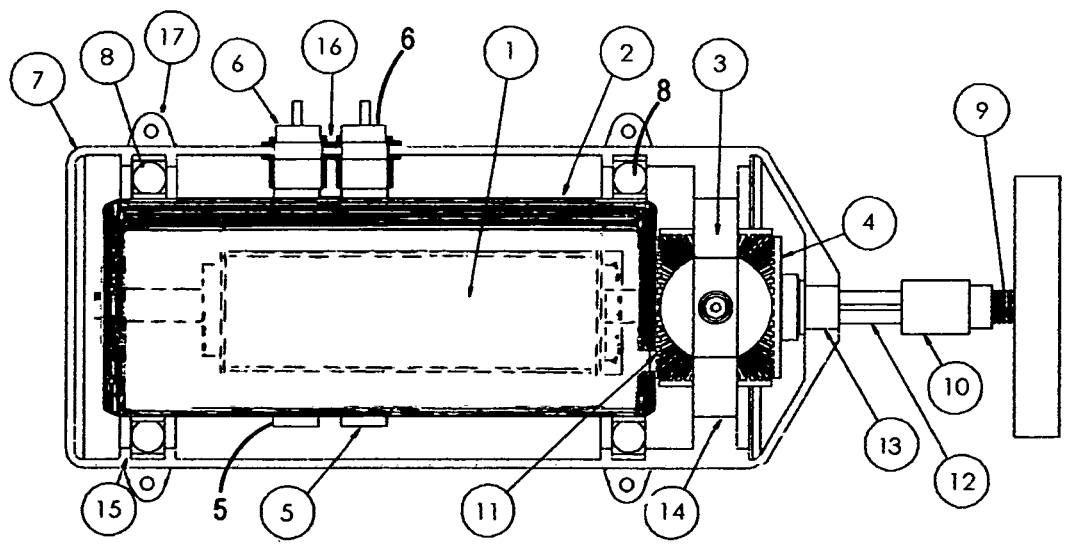
FIG. 5 illustrates a side view cutaway of the platform and the apparatus for utilizing the opposing force generated by torque.

As shown in FIGS. 1 and 3, each of the two mating semicircular parts 210, 220 of the platform 7 further includes two precisely positioned 'U' shaped furrows 28, cut out with a mold, form, or die, thereby forming two furrows that extend around the chamber of the platform 7. The furrows 28 are purposed to mate, and secure the outer races of two ball bearings 8 (see FIG. 6). A third furrow 27 (see FIGS. 1 and 4) manufactured in the same manner as the two previously defined furrows 28, supports an idler gear assembly 3 (see FIG. 7). Conduits 16 are cut through the platform 7, which allow passage, and support for a pair of contact brushes 6. A slip rings assembly, made up of the slip rings 5 and brushes 6 (see FIGS. 5 and 6), can channel current to the motor 1 and provide operator control of the motor 1.

Figure 6:
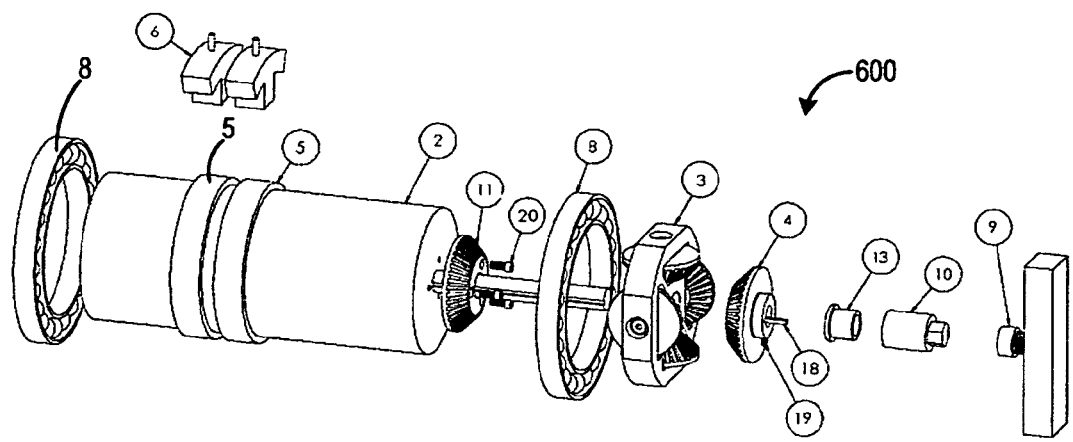
FIG. 6 illustrates an exploded perspective partial view of the apparatus for utilizing the opposing force generated by torque.

FIG. 6 illustrates an exploded view of the apparatus 600 for utilizing the opposing force generated by torque. The apparatus 600 includes an electric motor 1 with a cylindrical housing 2, slip rings 5 two ball bearings 8, a first beveled pinion 11, a beveled merging pinion 4, which coalesces the opposing force generated by torque with the source of the originating torque, and an assembly of idler gears 3. The cylindrical housing 2 of the electric motor 1 shares a common center with the drive shaft 12 of the motor 1. To facilitate an orderly assembly of the apparatus it is necessary to first fit two slip ring 5 around the motor housing 2. The two slip rings 5 are positioned directly beneath the conduits 16 of the finished product, before pressing on the inner races of two ball bearings 8 around each end of the motor housing 2, which is a novelty. The ball bearings 8 mate with the previously described furrows 28 made inside the chamber of the platform 7. The ball bearings 8 allow the motor housing 2 to rotate when the opposing force generated by torque being applied to a workpiece 9 by a drive shaft 12 of the motor 1 is coupled to a workpiece 9 by means of a bit 10 appended to the end of the drive shaft 12 when the motor 1 is activated.

The first beveled pinion 11 is affixed concentrically to the face of the motor housing 2 by fasteners 20, with the teeth of the first beveled pinion 11 facing away from the motor 1. The first pinion 11, which is a novelty, acts as a drive gear when the motor housing 2 rotates. The beveled merging pinion 4 is similar to the first beveled pinion 11, located on the front of the motor housing 2. The beveled merging pinion 4 can be affixed to the drive shaft 12 of the motor 1, with the teeth of the beveled merging pinion 4 facing toward the first pinion 11, by means of a keyway 18, and a setscrew 19.

Figure 7:
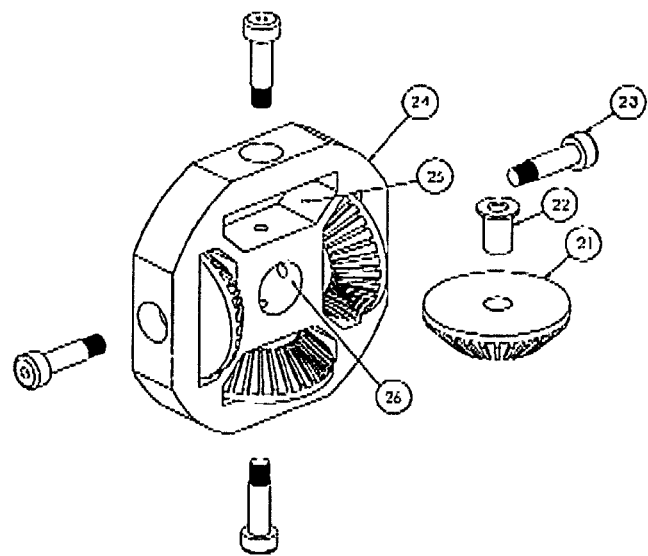
FIG. 7 illustrates an exploded perspective view of the bevel gears assembly of the apparatus for utilizing the opposing force generated by torque.

FIG. 7 illustrates the assembly of idler gears 3. The use of the assembly of idler gears 3 is an innovation. The assembly of idler gears 3 includes four beveled idler gears 21, and an octagonal frame 24. The octagonal frame 24 is one half the thickness of the diameters of the idler gears 21. Cutouts 25 are shaped through the octagonal frame 24 to accept the idler gears 21 if their teeth are facing toward the center of the octagonal frame 24. The cutouts 25 are evenly spaced around the octagonal frame 24 so as to allow the teeth of the beveled idler gears 21 to mesh with the teeth of the first pinion 11, and the merging pinion 4 when the idler gears assembly 3 is slipped over the motor drive shaft 12 by means of an opening 26 made in the center of the octagonal frame 24, and fitted into the heretofore described furrow 27 cut into the chamber of the platform 7. The beveled idler gears 21 are now set perpendicular to the motor drive shaft 12. The idler gear assembly 3 is meant to link the first pinion 11 appended to the face of the motor housing 2 to the merging pinion 4 when the merging pinion 4 is fitted over the drive shaft 12 with its teeth facing the first pinion 11, then adjusted, and secured by means of a keyway 18, and set screw 19.

With the various parts readied for their respective places, a bushing 13 is fitted around the drive shaft 12 to fit into the circular 29 made in the platform 7 for the drive shaft 12 to extend through. The halves of the platform 7 are mated, then drawn tight with fasteners 20, which completes the assembly of the apparatus. The described bushing 13 fitted over the drive shaft 12 adds stability to the invention.

When the drive shaft 12 of the motor 1 is coupled to a workpiece 9, and the motor 1 is activated, the torque applied to the workpiece 9 generates an equal and opposite force, which matches the rotation of the motor housing 2 and its pinion 11 as it rotates in the opposite direction of the originating torque. The herein described idler gears assembly 3 reverses the direction of the opposing force, which reconfigures the opposing force to match the originating torque, thus augmenting the torque being applied to the workpiece.

The invention claimed is:

1. An apparatus comprising
   an electric motor having a cylindrical housing wherein the cylindrical housing shares a common center with a drive shaft of the electric motor;
   two ball bearings wherein the ball bearings are positioned around each end of the motor housing;
   a first beveled pinion attached to one end of the motor housing wherein the first beveled pinion shares a common center with the motor housing and drive shaft of the electric motor and wherein the teeth of the first beveled pinion face away from the motor housing;
   a beveled merging pinion attached to the drive shaft of the electric motor wherein the teeth of the beveled merging pinion face toward the first beveled pinion; and
   an assembly of idler gears comprising a plurality of beveled idler gears wherein the shaft of the electric motor extends through the center of the assembly of idler gears, wherein the assembly of idler gears is positioned between the first beveled idler gears are configured such that the teeth of the beveled idler gears mesh with the teeth of the first beveled pinion and the beveled merging pinion and such that when the first beveled pinion rotates in a first direction, the assembly of idler gears redirects the first direction to match a second direction of the beveled merging pinion attached to the motor drive shaft.

2. The apparatus of claim 1 further comprising a housing configured to contain the electric motor, the motor housing, the ball bearings, the first beveled pinion, the second beveled pinion and the assembly of idler gears wherein the housing comprises an opening through which the drive shaft of the electric motor extends and furrows extending around the housing and configured to receive the ball bearings.

3. The apparatus of claim 1 wherein the housing further comprises a furrow extending around the housing and configured to receive the housing of the assembly of the idler gears.

4. The apparatus of claim 1 wherein the assembly of idler gears comprises a frame and four beveled idler gears wherein the frame includes openings to receive the beveled idler gears such that the teeth of the beveled idler gear face toward the center of the frame and such that the beveled idler gears are evenly spaced around the center of the frame.

5. An apparatus comprising:
   a motor having a housing wherein a drive shaft of the motor extends through the center of the housing;
   at least one ball bearing wherein the ball bearing is positioned around the motor housing;
   a first beveled pinion attached to one end of the motor housing wherein the drive shaft of the motor extends through the center of the first beveled pinion and wherein the teeth of the first beveled pinion face away from the motor housing;
   a beveled merging pinion attached to the drive shaft of the motor wherein the teeth of the beveled merging pinion face toward the first beveled pinion; and
   an assembly of idler gears comprising a plurality of beveled idler gears wherein the drive shaft of the electric motor extends through the center of the assembly of idler gears, wherein the assembly of idler gears is positioned between the first beveled pinion and the beveled merging pinion, and wherein the plurality of beveled idler gears are configured such that the teeth of the beveled idler gears mesh with the teeth of the first beveled pinion and the beveled merging pinion and such that when the first beveled pinion rotates in a first direction, the assembly of idler gears redirects the rotation of the first beveled pinion to match the rotation of the beveled merging pinion attached to the motor drive shaft.

6. The apparatus of claim 5 further comprising a housing configured to contain the motor, the motor housing, the as least one ball bearing, the first beveled pinion, the beveled merging pinion and the assembly of idler gears wherein the housing comprises an opening through which the drive shaft of the motor extend and at least one furrow extending around the housing and configured to receive the at least one ball bearing.

7. The apparatus of claim 5 wherein the housing further comprises a furrow extending around the housing and configured to receive the housing of the assembly of idler gears.

8. The apparatus of claim 5 wherein the assembly of idler gears comprises a frame and four beveled idler gears herein the frame includes opening to receive the beveled idler gears such that the teeth of the beveled idler face toward the center of the frame and such that the beveled idler gears are evenly spaced around the center of the frame.

* * * * *